United States Patent [19]

Smith

[11] Patent Number: 4,844,606
[45] Date of Patent: Jul. 4, 1989

[54] TEMPLE FASTENER FOR EYEGLASS FRAMES

[76] Inventor: Franklin G. Smith, 2944 S.E. Tibbetts, Portland, Oreg. 97202

[21] Appl. No.: 55,544

[22] Filed: May 29, 1987

[51] Int. Cl.⁴ ............................ G02C 5/22; G02C 5/14
[52] U.S. Cl. ............................. 351/153; 351/121; 16/228
[58] Field of Search ............... 351/121, 153; 16/228

[56] References Cited

U.S. PATENT DOCUMENTS 2,160,686  5/1939  Splaine et al. .
2,220,453  11/1940  Lowres .
2,328,708  9/1943  Cook et al. .
4,406,527  9/1983  Schönhut ............................ 351/153
4,461,549  7/1984  Reese et al. .

FOREIGN PATENT DOCUMENTS 612061  1/1961  Canada ............................... 351/153

Primary Examiner—Rodney B. Bovernick
Attorney, Agent, or Firm—Klarquist, Sparkman, Campbell, Leigh & Whinston

[57] ABSTRACT

A hinge connection for eyeglasses connects a lens frame to a temple piece with a threaded pin which does not loosen or fall out of the hinge even after repeated hinging movement of the temple piece. The hinge has a bore which is lined with an insert made of a material having cold flow characteristics. The liner has an untapped bore with a diameter slightly smaller than the major diameter of the pin. The pin has interrupted ferrule threads. When the pin is pushed into the bore of the liner, cold flow reformation of the bore locks the pin in place. The pin can be removed from the liner when desired by rotating the pin to cause its threads to form complementary helical thread in the bore wall and thereby thread its way out of the liner.

11 Claims, 1 Drawing Sheet

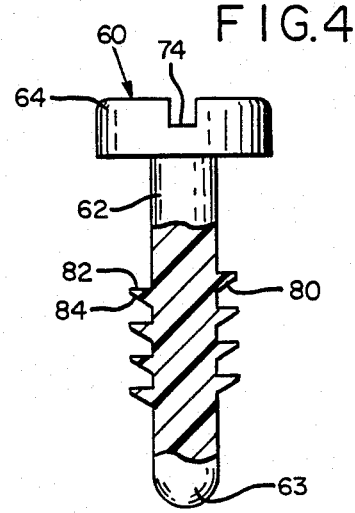
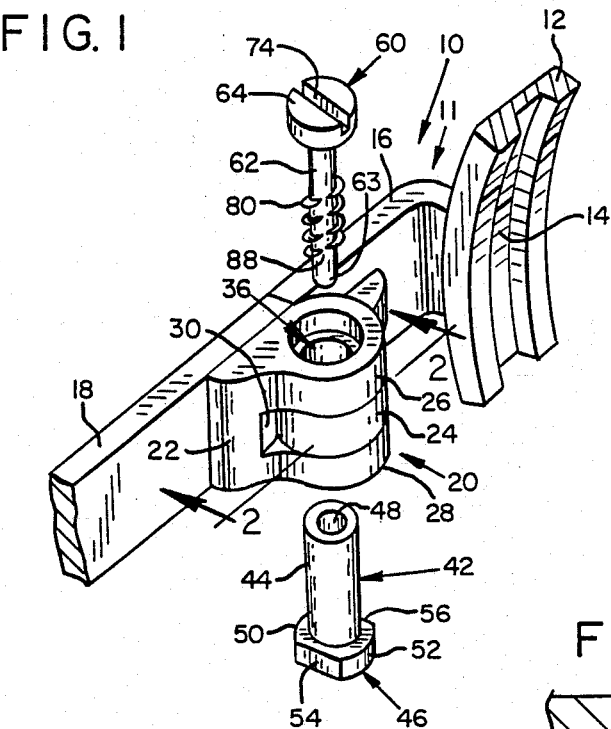
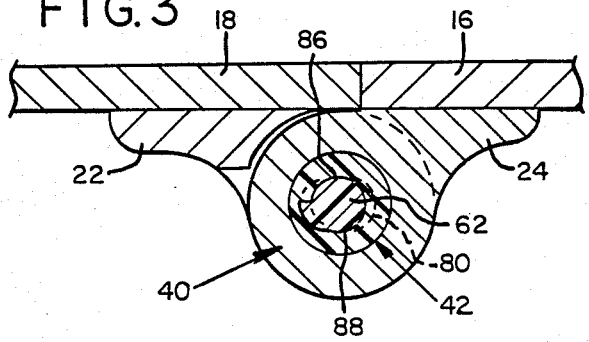
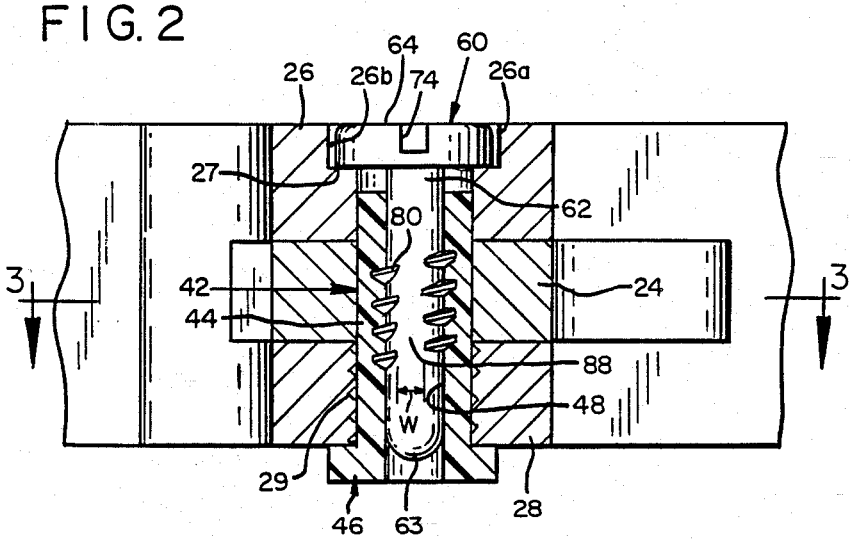

TEMPLE FASTENER FOR EYEGLASS FRAMES

BACKGROUND OF THE INVENTION

1. Field of the Invention

This invention concerns a fastener for eyeglass frames, and more particularly a fastener for pivotally interconnecting the temple and lens frame portions of the eyeglass.

2. General Discussion of the Background

Conventional eyeglasses typically include a pair of lenses carried by a lens frame, a pair of temple pieces hingedly connected to each side of the lens frame, and an earpiece at the free end of each temple piece. The temple piece and lens frame are usually joined at a hinge connection which permits rotation of the temple piece relative to the lens frame. The temple piece and lens frame each have hinge members with threaded bores which are aligned to form a hinge opening into which a screw is threaded to serve as the hinge pin and form the hinge connection. Unfortunately, the hinge screw is usually progressively unthreaded from the hinge opening through repeated pivotal movement of the temple piece relative to the lens frame. Eventually, the hinge screw drops out of the hinge opening and is lost, and the frame becomes unstable and eventually comes apart. Eyeglass wearers often attempt to prevent loss of the hinge screw by periodically tightening it, but such precautions are a nuisance. Usually the wearer does not have a specialized miniature optical screwdriver of the proper size to efficiently and effectively do the job, and instead attempts to tighten the screw with a knife blade, eventually rendering the screw's driving slot useless.

U.S. Pat. Nos. 2,160,686; 2,220,453; and 2,328,708 all disclose fasteners for interconnecting eyeglass lenses to eyepieces or temple pieces. Although the fasteners disclosed in each of these patents provides a secure attachment between parts of the eyeglasses, they do not permit relative pivotal movement between the interconnected parts.

U.S. Pat. No. 4,461,549 discloses a connector for attaching earpieces with a pair of flexible suspension lines instead of temple pieces. Although this structure avoids the problem of loose and lost screws, it provides a less sturdy eyeglass frame than conventional such frames. There is therefore a need for an improved hinge connection between the temple pieces and lens frame of an eyeglass frame that prevents the loosening and loss of the hinge screw.

A primary object of the present invention is to provide conventional eyeglass frames with an improved hinge connection between their temple pieces and lens frame.

Another primary object is to provide an improved hinge connection for eyeglass frames which eliminates the problem of loose and lost hinge screws.

Another primary object is to provide an improved method of hinging together the temple pieces and lens frame of an eyeglass frame so as to prevent the frame parts from becoming unstable and separated.

Another primary object is to provide an improved fastener for hingedly fastening the temple pieces to the lens piece of an eyeglass frame that eliminates the problem of loose and lost hinge screws and which is adaptable to existing eyeglass frames.

SUMMARY OF THE INVENTION

The foregoing objects are achieved by providing a fastener for eyeglass frames which includes a liner with an internal bore. A pin, which is insertable within the bore, changes the shape of the bore to retain the pin within the liner. In a preferred embodiment, the wall of the bore is smooth and has cold flow characteristics. The pin carries a retention means which promotes cold flow reformation of the smooth wall of the bore to lock the pin in the liner.

In the preferred embodiment, the retention means includes a ferrule-type thread which at least partially circumscribes the pin and is characterized by a flat top surface profile normal to the longitudinal axis of the pin, and a bottom surface profile angled to reduce resistance to insertion of the pin into the bore. The thread preferably has flattened crest portions which interrupt the helical path of the thread to prevent free rotation of the pin after it has been inserted within the liner. Free pin rotation is prevented because the bore wall is reformed into the shape of an incomplete helix instead of a complete helical internal thread. When pin removal is desired, the pin is forcibly rotated such that the pin threads cut or otherwise form a complete helical thread in the wall of the bore. The pin can thus be rotated in a conventional fashion to remove it from the bore of the hinge.

The present invention also includes a method of forming a hinge connection between cooperative interengaging hinge members of a temple portion and a lens holding portion in an eyeglass frame. The method is performed by aligning the hinge members of the temple and lens holding portions to form a hinge pin bore having an unthreaded internal bore wall with cold flow characteristics. A threaded pin is then pushed into the hinge bore to reform the bore wall around the threaded pin and prevent withdrawal of the pin from the opening.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 1 is a fragmentary, exploded perspective view of a hinge connection between the temple piece and lens holder of an eyeglass frame in accordance with the present invention.

FIG. 2 is an enlarged cross-sectional view taken along section lines 2—2 in FIG. 1, with the hinge connection fully assembled.

FIG. 3 is a cross-sectional view taken along section lines 3—3 in FIG. 2.

FIG. 4 is a side elevational view, partially in section, of a hinge pin of the present invention.

DETAILED DESCRIPTION OF PREFERRED EMBODIMENT

Eyeglasses typically include an eyeglass frame 10 (FIG. 1) including a lens frame portion 11 hinged on opposite sides to a pair of temple pieces 18 (only one being shown). Lens frame 11 includes a pair of generally circular or oval lens holders 12 (only one is shown) which each form an annular groove 14 for holding an eyeglass lens. Each holder 12 is rigidly connected to a short, L-shaped or angular member 16, which is in turn hinged to a temple piece 18. Each temple piece 18 is sufficiently long to extend across a wearer's temple to his ear where the temple piece supports an earpiece (not shown). The earpiece fits over the wearer's ear to support the glasses in a fixed position on the wearer's head.

The temple piece 18 and member 16 are pivotally interconnected at a hinge connection 20 which is formed by a pair of conventional cooperative hinge members 22, 24. Bifurcated hinge member 22 is carried by the inside face of temple piece 18, and includes spaced, parallel upper and lower rings 26, 28 which extend inwardly and forwardly of temple piece 18 toward L-shaped member 16 and are separated by a slot 30. The interior wall of upper ring 26 is unthreaded and forms a recessed shoulder 27 at the intersection of an outer, large diameter bore 26a and an inner, smaller diameter bore 26b. The interior wall of lower ring 28 has a substantially uniform diameter and is internally threaded at 29 for engaging mating threads of a conventional hinge screw (not shown) forming no part of the present invention. Such a screw heretofore would hold the hinge together. The threads in the interior wall of ring 28 are unnecessary to the present invention but are shown to illustrate that the fastening means of the present invention can be used with conventional eyeglass temple and lens piece hinges.

Hinge member 24 is a conventional ring that is mounted on the inner face of member 16 and projects inwardly and rearwardly towards slot 30. The inner face of the ring formed by member 24 is smooth and forms a bore having substantially the same diameter as bore 26b and the tapped bore defined by ring 28.

Hinge members 22, 24 are interengaged to form hinge connection 20 by inserting member 24 into slot 30 and aligning members 22, 24 such that bore wall 26b and the bore wall of ring 28 are aligned with the bore wall of ring 24 (FIG. 2) to form a through hinge bore 36 (FIG. 1). A fastener means or assembly 40, comprising a sleeve-like liner 42 and a cooperative hinge pin 60, is inserted into bore 36 to hinge members 22, 24 together.

Liner 42 (FIG. 1) has a hollow, cylindrical shank 44 and an enlarged base 46. Shank 44 is of slightly smaller diameter than bore 36 such that shank 44 can be inserted into hinge connection 20 and bear snugly against the walls of bore 36. As will be more apparent hereinafter, hinging action of members 22, 24 occurs about liner 42, not about pin 60. A smooth-wall internal bore 48 through shank 44 provides a lining for the interior of hinge connection 20 when shank 44 is inserted into bore 36. The enlarged base 46 has a pair of opposed arcuate edges 50, 52, and a pair of opposed flat edges 54, 56. The flat edges 54, 56 provide gripping or wrenching surfaces which can easily be gripped by pliers to facilitate removal of pin 60 from the bore of the liner in a manner explained below. The maximum diameter of base 46 is greater than the diameter of bore 36 so that base 46 abuts the lower end surface of hinge member 28 to position the liner shank within the hinge opening.

Liner 42 is preferably made of a material having cold flow characteristics which permit the material to be permanently deformed as a result of prolonged depression or extension at or near room temperature. The liner can be made of vulcanized rubber or some plastic materials, such as nylon, which exhibit these properties. The unthreaded bore 48 through shank 44 therefore provides a smooth-walled lining of circular cross section and having cold flow characteristics within connection 20.

Hinge pin 60 cooperates with liner 42 to form fastener means 40 within hinge connection 20. Pin 60 includes a shank 62, a rounded bottom 63, and an enlarged, round flat head 64. A slot 74 extends across head 64 to provide a driving means in which a screwdriver can be inserted. Head 64 is of larger diameter than the bore defined by wall 26b but smaller than the countersunk bore formed by wall 26a. Head 64 therefore rests on shoulder 27 within countersunk bore 26a during use, with its top surface substantially flush with the top surface of hinge member 26.

A helical ferrule thread 80 is provided on shank 62. As seen in FIG. 4, such thread in profile has a flat top surface 82 which is substantially perpendicular to the axis of shank 62, and an inclined bottom surface 84 angled to reduce resistance to insertion of pin 60 into bore 48. In the disclosed embodiment, surfaces 82 and 84 form about a 30° included angle between each other. An included angle of between 20° to 70° would also reduce resistance to insertion of pin 60 into bore 36.

FIG. 3 shows that thread 80 has an elliptical cross section and not the circular cross section usually observed with helical threads around screws. This elliptical shape is the result of crest portions of thread 80 being flattened on opposite sides of the shank to form thread interruptions 86, 88. The interruptions extend longitudinally along shank 62 in the direction in which the pin is inserted into bore 48 to facilitate entry of the shank of the pin into the bore of the liner.

The shank of pin 60 is sized such that the maximum diameter of the shank across the thread crests is greater than the diameter of the bore of liner 42. However, the minimum diameter of the shank should be substantially no greater than the diameter of such bore.

In operation, hinge members 22, 24 are first interengaged by placing member 24 in slot 30 between rings 26, 28 and aligning bore walls of members 24, 26, and 28 to form hinge opening or bore 36. Liner 42 is then inserted at least partially into bore 36 from beneath ring 28. The rounded end 63 of pin 60 is inserted into the upper end of bore 48 of liner 42. Then, using, for example, jeweler's pliers, the liner and pin are pinched together, pushing the pin axially into the bore of the liner until the base of the liner abuts the bottom surface of hinge ring 28 and head 64 of pin 60 rests within countersunk bore 26a. In this condition the hinge connection is complete and cannot be separated during normal use of the eyeglass frame.

During assembly of the connection, the angled bottom surfaces 84 of thread 80 decrease the resistance to insertion of the pin, whereas flat top surfaces 82 will inhibit withdrawal of pin 60 from bore 48. After insertion of the pin is completed, cold flow deformation properties of the wall of bore 48 permit the wall to reform around thread 80 (as shown in FIG. 2) to interlock pin 60 and liner 42. Rotation of pin 60 within bore 48 is prevented, in the absence of an external torque applied to the pin, because the reformed wall of bore 48 lacks a continuous helical thread because of the manner in which the pin was inserted and especially after cold flow reformation of the wall. The flattened thread portions 86, 88 on both sides of thread 80 have prevented cold flow formation of a continuous helical thread. The pin will not become loose or lost because it is held immobile in connection 20 by the liner material.

Hinge connection 20 permits rotation of hinge members 22, 24 relative to one another about the liner, without allowing inadvertent or unwanted movement of pin 60 that could loosen it. Liner 42 serves as a bearing surface about which temple hinge members 26, 28 rotate, while pin 60 and liner 42 remain stationary relative to one another. The wearer of the eyeglasses is therefore free from the concern that the pin will work its way out of the hinge connection 20 to weaken the connection or become lost.

If it becomes necessary to take the hinge connection apart, for example when replacing a temple piece 18, the blade of a small screwdriver can be inserted in slot 74 of head 64 while base 46 of liner 42 is gripped and held stationary by a pair of pliers, to exert a torque on pin 60 that will cause it to thread its way out of the liner bore by cutting threads in the bore wall 48. The helical thread, which has already been incompletely formed by deformation of the wall of bore 48, will be completed when pin 60 has been rotated through an arc subtended by the distance W (FIG. 2), which is the width of each cutaway portion 86, 88. Once the helical thread is complete, pin 60 is removed from sleeve 42 by turning it with a screwdriver in the conventional manner. After pin 60 has been removed from liner 42, the liner can be discarded and a new liner with a smooth untapped bore wall 48 used to reestablish the hinge connection as described above such that the pin will not loosen or work itself out of the connection.

Having illustrated and described the principles of the invention in a preferred embodiment, it should be apparent to those skilled in the art that the invention can be modified in arrangement and detail without departing from such principles. I claim all modifications coming within the spirit and scope of the following claims.

I claim:

1. A fastener for the hinged temple connection of eyeglass frames, comprising:
    a plastic liner for insertion within an opening of said hinged connection, said liner defining a smooth-walled bore;
    a pin insertable into said bore by a non-rotating axial pushing action, the pin having a shank sized to be received snugly within said bore when the pin is pushed into said bore; and
    said pin including retention means for resisting removal of said pin from said bore, wherein said retention means comprises a plurality of partial ridges extending helically along a portion of the shank and at least one ridge interruption extending longitudinally along the shank, wherein the ridges have a top surface substantially normal to the axis of the shaft for resisting removal of the pin from the bore and a bottom surface angled to reduce resistance of insertion of the pin into the bore.

2. The fastener of claim 1 wherein said liner comprises a material having cold flow characteristics and is operable through cold flow reformation upon insertion of said pin to interlock with said retention means to retain said pin within said bore.

3. The fastener of claim 2 wherein said liner comprises a nylon material.

4. The fastener of claim 1 wherein said pin includes an enlarged head having driving means for rotating said pin to cut threads into the bore wall.

5. The fastener of claim 4 wherein said driving means comprises a slotted head.

6. The fastener of claim 4 wherein said liner includes a flanged end having gripping means for facilitating relative rotation of said pin and liner.

7. The fastener of claim 6 wherein said driving means comprises a slotted head and said gripping means comprises opposed flat flange edge surfaces.

8. A fastener for eyeglass frames, comprising:
    a liner for insertion within a hinge opening at a hinge connection between a temple support and a lens frame, said liner comprising a cylindrical shank for insertion into said hinge opening and an enlarged base wider than said hinge opening, said shank including an axial untapped bore, said liner comprising a plastic material having cold flow characteristics; and
    a pin insertable in said bore and comprising an enlarged slotted head wider than said bore, and a shank having a helical thread, said thread profile including a top surface extending normal to the axis of said shank and a bottom surface extending at an angle to said axis to minimize resistance to insertion of said shank into said bore, the crest of said thread being flattened at intervals to resist free rotation of said shank within the bore of said liner.

9. A method forming a hinge connection between cooperative hinge members of a temple portion and a lens portion of an eyeglass frame, said method comprising the steps of:
    aligning said hinge members to form a hinge opening extending therebetween;
    lining said hinge opening with a material having cold flow characteristics to define an untapped hole; and
    axially pushing without rotation a threaded pin into the untapped hole, the pin having a shank of a diameter sized to be received snugly in the untapped hole, the shank including a helical thread extending along at least a portion of the shank and the thread having a top surface substantially normal to the axis of the shaft for resisting removal of the pin from the bore and a bottom surface angled to reduce resistance of insertion of the pin into the bore, the thread of the pin having a crest diameter greater than the diameter of the untapped hole to cause the material in the lined hinge opening to reform about the threaded pin and thereby resist withdrawal of said pin from said opening, thereby locking the pin in the untapped hole.

10. The method of claim 9 including inserting a sleeve with a smooth axial bore into the opening to line the opening.

11. The method of claim 9 including removing the pin from the hole by rotating the pin relative to the untapped hole in a direction to cause the thread to form a mating internal thread in the wall defining the untapped hole to thread the pin from the hinge opening.

* * * * *